Oct. 25, 1927.

H. E. GROSSENBACHER 1,646,858

COOKING UTENSIL

Filed Dec. 3, 1924

Inventor:
H. E. Grossenbacher,
by Pippey Kingsland
His Attorneys.

Patented Oct. 25, 1927.

1,646,858

UNITED STATES PATENT OFFICE.

HENRY E. GROSSENBACHER, OF OVERLAND, MISSOURI.

COOKING UTENSIL.

Application filed December 3, 1924. Serial No. 753,547.

This invention relates to cooking utensils, and particularly to a cooking utensil adapted to be used as a corn popper.

An object of the invention is to provide a utensil of the class mentioned that may be set directly upon the stove and which is provided with a removable transparent cover and equipped with a stirring device for agitating the contents of the utensil.

Figure 1:
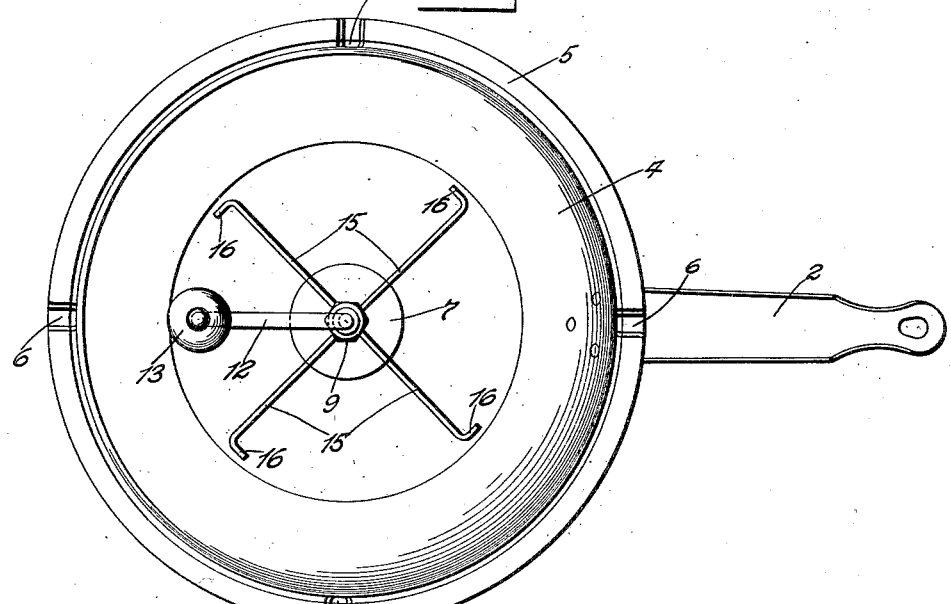

Additional advantages of the construction will be apparent from the following detailed description thereof taken in connection with the accompanying drawing, in which Fig. 1 is a plan view.

Figure 2:
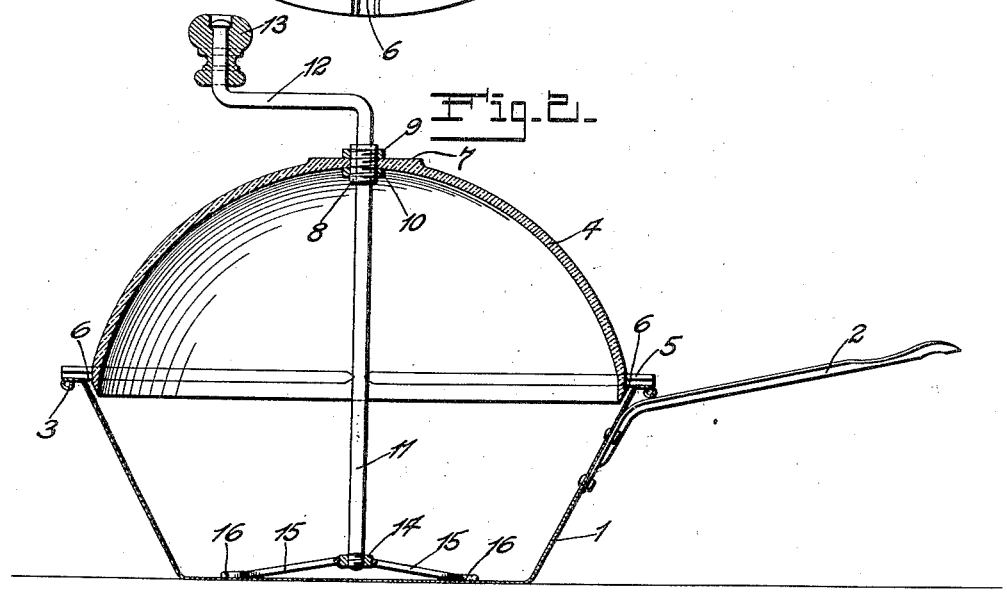

Fig. 2 is a vertical section.

The utensil as shown in the drawing comprises a vessel preferably in the form of a sauce pan 1 equipped with a handle 2 having an over-turned flange 3 at its upper edge. The vessel may be made of any suitable metal such as aluminum, tin or the like.

A dome-shaped cover 4, made preferably of annealed glass so that it will withstand a high degree of heat, is set upon the upper edge of the vessel, said cover having a horizontal flange 5 integrally formed therewith, the lower edge of the cover extending downwardly below the flange so as to fit within the marginal edges of the vessel 1, the flange 5 resting against the upper face of the flange 3 of the vessel.

At spaced intervals notches 6 are formed in the flange 5, said notches extending inwardly a sufficient distance so that when the cover is mounted upon the vessel 1 the base of the notches 6 will be within the circumference of the inner edge of the vessel so as to provide vent openings for the vessel.

The cover 4 is provided with a circular axially positioned reinforcement 7 having an opening therein. A sleeve 8 fits within the opening, said sleeve being exteriorly threaded and adapted to receive nuts 9 and 10 whereby it may be mounted in said opening and clamped removably in place.

An agitator for agitating the contents of the vessel is provided. The agitator includes a rod 11 that extends through the sleeve 8 in which it is revolvably supported and in which it is capable of movement. The rod 11 at its upper end is bent to form a handle 12 provided with a knob 13, said handle constituting means for manually rotating the rod 11. The rod 11 carries at its lower end a spider composed of a hub 14 detachably attached to the lower end of the rod, said hub having a plurality of laterally extending arms 15 attached thereto, said arms each having an overturned end 16.

In operating the utensil the cover is removed and popcorn, for instance, is placed within the vessel and the cover mounted in place. The contents of the vessel is then agitated by revolving the rod 11, the rod 11 being raised or lowered in the sleeve 8 by the operator to thoroughly mix and stir the contents confined within the vessel 1 by the top 4.

I am aware that the invention may be varied in numerous particulars without departing from the spirit and scope thereof.

I do not limit myself unessentially, but what I claim and desire to secure by Letters Patent is:—

1. A cooking utensil comprising a vessel having an open upper end, a cover extending into the upper end of said vessel and spaced therefrom, and an external flange in connection with said cover above the lower edge of said cover seating on the upper edge of the vessel and provided with a number of vent openings therethrough extending inwardly beyond the inner wall surface of the vessel.

2. A cooking utensil comprising a vessel having an open upper end, a dome-like cover having its lower edge extending into the upper end of said vessel and spaced therefrom, and an external flange in connection with said cover above the lower edge of said cover seating on the upper edge of the vessel and provided with a number of vent openings therethrough extending inwardly beyond the inner wall surface of the vessel.

3. A cooking utensil comprising a metallic vessel having an open upper end, a dome-like glass cover extending into the upper end of said vessel and spaced therefrom, and an external flange in connection with said cover above the lower edge of said cover seating on the upper edge of the vessel and provided with a number of vent openings therethrough extending inwardly beyond the inner wall surface of the vessel.

HENRY E. GROSSENBACHER.